Oct. 4, 1960 P. R. HOFFMAN 2,954,923

RECORD SCANNING AND DECODING APPARATUS

Filed March 27, 1957 11 Sheets-Sheet 1

*INVENTOR.*
PAUL R. HOFFMAN
*BY*
*William R. Nolte*
AGENT

Oct. 4, 1960 P. R. HOFFMAN 2,954,923

RECORD SCANNING AND DECODING APPARATUS

Filed March 27, 1957 11 Sheets-Sheet 2

INVENTOR.
PAUL R. HOFFMAN
BY
William R. Nolte
AGENT

RECORD SCANNING AND DECODING APPARATUS

Filed March 27, 1957 11 Sheets-Sheet 3

*INVENTOR.*
PAUL R. HOFFMAN
*BY*
William R. Nolte
AGENT

INVENTOR.
PAUL R. HOFFMAN
BY
William R. Nolte
AGENT

Fig. 10
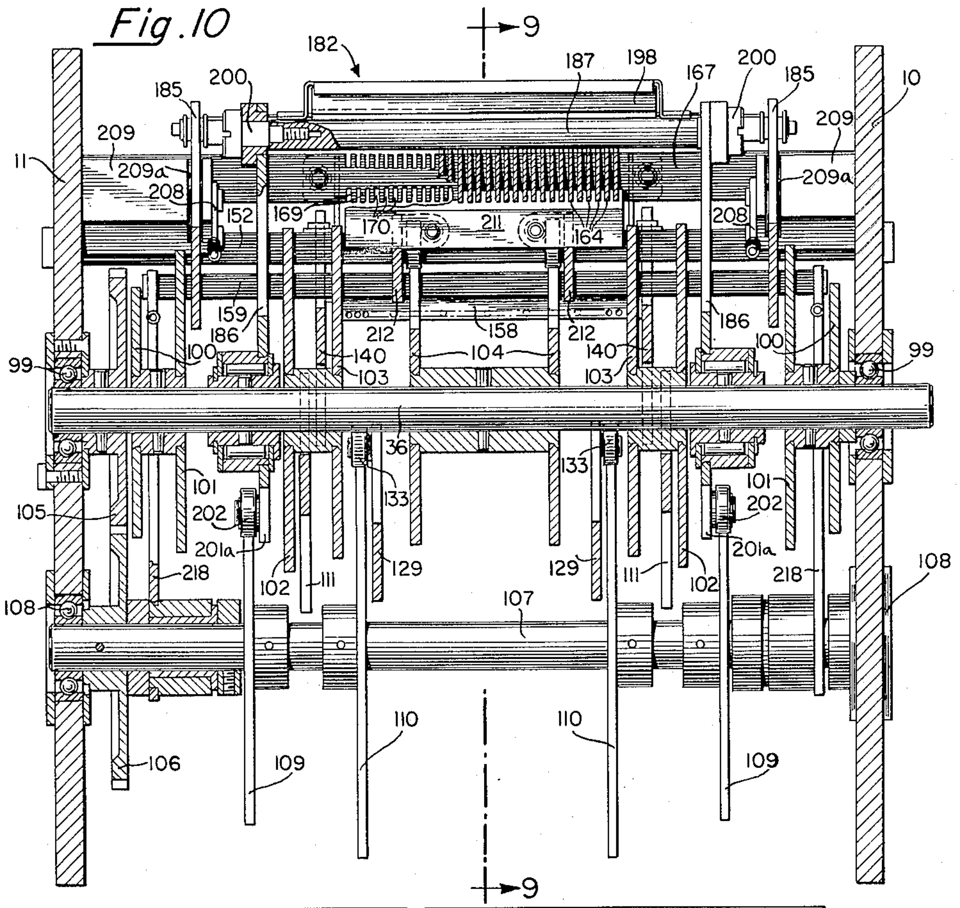
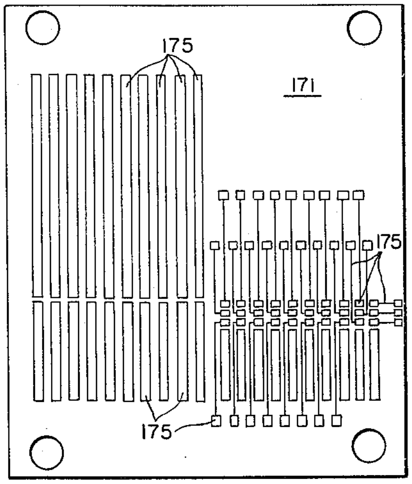
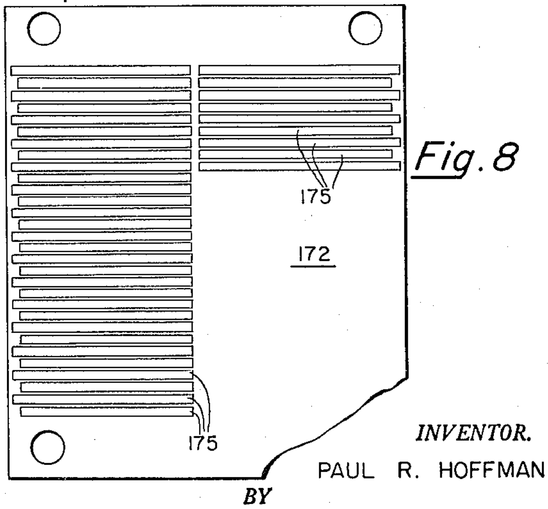
Fig. 8
Fig. 7
INVENTOR.
PAUL R. HOFFMAN
BY
William R. Nolte
AGENT INVENTOR.
PAUL R. HOFFMAN
BY
William R. Nolte
AGENT

RECORD SCANNING AND DECODING APPARATUS

Filed March 27, 1957 11 Sheets-Sheet 7

INVENTOR.
PAUL R. HOFFMAN
BY
William R. Nolte
AGENT

Oct. 4, 1960 P. R. HOFFMAN 2,954,923

RECORD SCANNING AND DECODING APPARATUS

Filed March 27, 1957 11 Sheets-Sheet 8

INVENTOR.
PAUL R. HOFFMAN
BY
William R. Nolte
AGENT

Oct. 4, 1960 P. R. HOFFMAN 2,954,923

RECORD SCANNING AND DECODING APPARATUS

Filed March 27, 1957 11 Sheets-Sheet 9

INVENTOR.
PAUL R. HOFFMAN

BY William R. Nolte
AGENT

RECORD SCANNING AND DECODING APPARATUS

Filed March 27, 1957 11 Sheets-Sheet 10

INVENTOR.
PAUL R. HOFFMAN
BY William R. Nolte
AGENT

RECORD SCANNING AND DECODING APPARATUS

Filed March 27, 1957 11 Sheets-Sheet 11

INVENTOR.
PAUL R. HOFFMAN
BY William R. Nolte
AGENT

United States Patent Office 2,954,923

Patented Oct. 4, 1960

2,954,923

RECORD SCANNING AND DECODING APPARATUS

Paul R. Hoffman, Woodlyn, Pa., assignor to Burroughs Corporation, Detroit, Mich., a corporation of Michigan Filed Mar. 27, 1957, Ser. No. 648,961

11 Claims. (Cl. 235—61.11)

This invention relates to a reading and decoding apparatus and more particularly to an apparatus of the above mentioned class, wherein coded data contained in a record medium is utilized in determining mechanical positions.

The present invention resides in the provision of sensing means, and decoding means in which a punched code in a record medium is translated and is reflected in proportional mechanical movement of rack means.

One of the objects of the invention is the provision of punched code interpreter capable of high speed sensing and decoding.

Another object of the invention is to provide a high speed sensing mechanism capable of sensing in rapid succession the data designating channels of a perforated record.

Another object of the invention is to provide a record scanning device which enables the simultaneous interpretation of a series of characters coded by markings contained in a plurality of channels arranged parallel to the direction of feed of the record and wherein each transverse row of perforations is representative of one character, and further wherein the information for each character is obtained additively by scanning each row in a direction of feed of the record, which information in turn is reflected in an amount of mechanical movement corresponding to the value of the perforations sensed.

A further object of the invention is the provision of high speed sensing mechanism capable of sensing in rapid succession the data designating channels of a perforated record, and wherein the data sensed in the individual channels may be utilized in determining successive mechanical movements of varying amounts.

A further object of the invention is to provide a parallel code scanning mechanism which obviates the need for interpretation of the information which has been sensed.

With these and other objects in view, a preferred embodiment of the present invention contemplates a single row of sensing pins oriented in parallel arrangement with parallel disposed perforation channels in a record. The row of sensing pins as a group is stepped transversely to the record and adjacent to one surface of the record and caused to dwell in alignment with a perforation channel. The sensing pins are then moved during the dwell period to cause the ends of sensing pins opposite perforations in a given channel to be passed through to the other surface of the record, the remaining pins not opposite perforation in the record being restrained by the record to remain adjacent said one surface thereof. A plurality of interposers adjacent other surface of the record are then moved into engagement with the projecting end of those pins passed through the perforations and are caused to trip latch means which normally restrain against movement a plurality of rack means. Stop means also normally limiting the movement of said rack means, are moved a distance corresponding to, and proportional to the value of the perforation being sensed, the latter movement being synchronized with the movement of said interposers. Electrical contact means moved by said rack means engage printed circuit means disposed adjacent said rack means and select electrical circuits corresponding to the mechanical movement of said racks.

Other objects of the invention will be pointed out in the following description and claims, and illustrated in the accompanying drawings, which disclose by way of examples, the principle of the invention and the preferred manner of applying that principle.

In the drawings:

Fig. 7 is a plan view of a printed circuit panel;

Fig. 8 is a plan view of another printed circuit panel;

Fig. 10 is a transverse sectional view taken on line 10—10 of Fig. 9;

Figure 1:
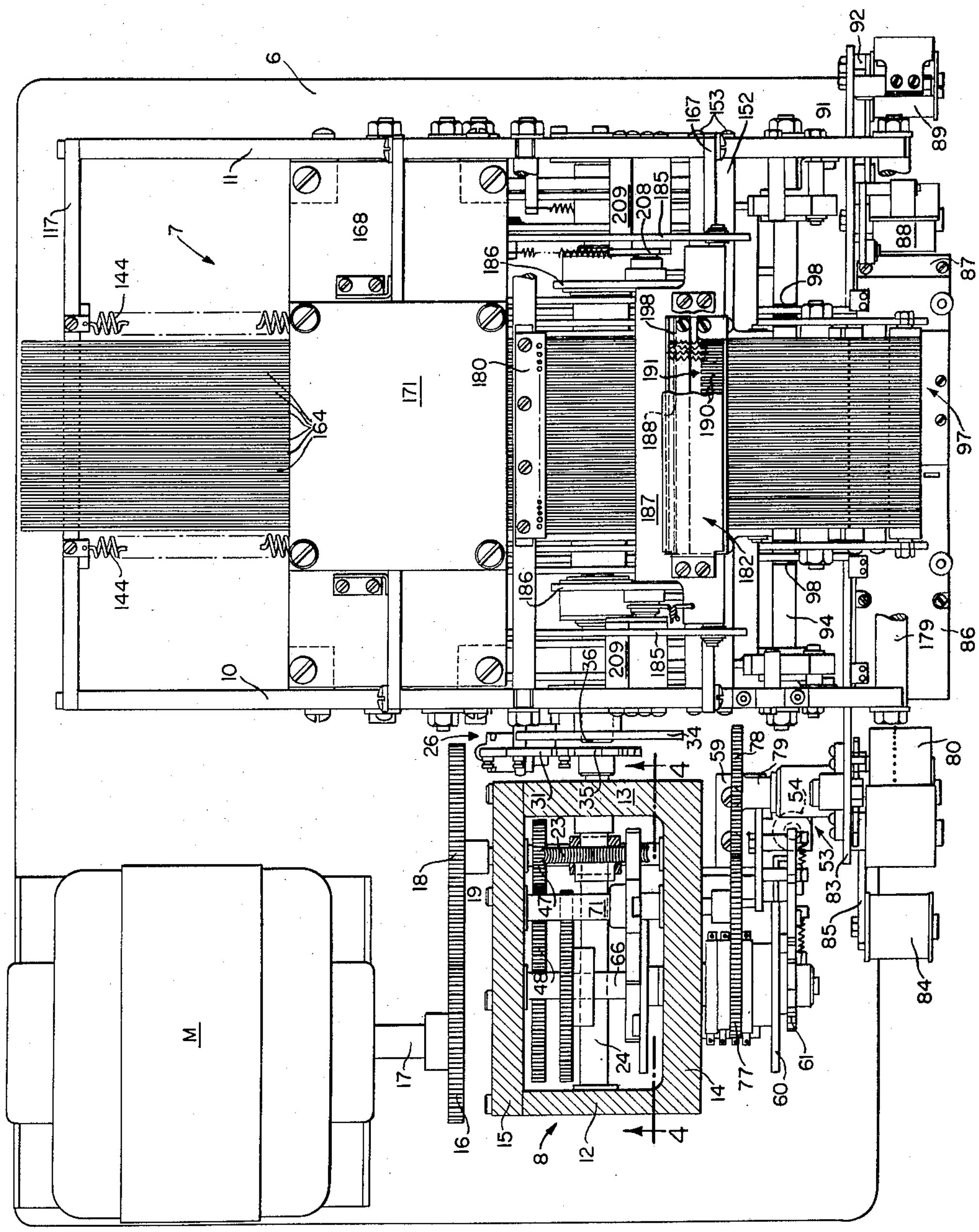
Fig. 1 is a plan view of a machine embodying the invention.

The subject matter of this invention relates to the apparatus of the type described and claimed in the copending application for patent of Paul R. Hoffman, entitled "Transverse Record Scanning Mechanism," Serial No. 615,343, filed October 11, 1956, now issued as Patent Number 2,850,238, and assigned to the same assignee as the present application.

Referring to the drawings in detail and particularly to Figs. 1, 2, 3, 4 and 5, a main base plate 6 of any suitable type supports the entire framework and driving mechanism of the machine. The pin sensing and decoding unit 7 is supported by two upright plates 10 and 11. The record feeding unit 8 is additionally supported by two pairs of upright walls 12, 13, 14 and 15. The power supply for driving the two units is derived from a motor M suitably secured to the base plate 6. The tape read motor M rotates gear 16 fastened to the shaft 17 of said motor; gear 16 meshes with gear 18 and thereby causes shaft 19 to rotate. The ends of shaft 19 are suitably mounted in bearings 20, 21 affixed to the end walls 14 and 15, respectively. Worm 22 fastened to the shaft 19 intermediate its length then drives, through worm wheel 23, shaft 24 which is supported for rotation in bearings 25 in side walls 12, 13 of said aforementioned tape feed unit 8. A clutch 26 intermediate said tape feed unit 8 and the tape sensing and decoding unit 7 includes a clutch magnet 27, see Fig. 3, affixed to upright plate 10 by means of bracket 28. Upon being energized magnet 27 causes clapper 29 of said magnet to strike stop lever 30 and rotate it clear of the tape sensing clutch dog 31. Stop lever 30, it will be observed is pivotally mounted as at 32 to plate 10 of the tape sensing unit. The tape sensing clutch dog 31 is pivotally fastened at 33 to anti-backup cam 34 and engages toothed wheel 35 fixed to shaft 24. The anti-backup cam 34 is fastened to the tape sensing drive shaft 36. Clapper 29 upon de-energization of magnet 27 is urged away from said magnet by spring 37 connected at one of its ends to an extremity of said clapper and at its other end to magnet mounting bracket 28. Stop lever 30 is likewise normally moved by means of spring 38 affixed at one of its ends to pin 39 mounted to said lever and its other end to spring post 40 mounted to plate 10. The above mentioned clutch dog 31 upon being released from engagement by said stop lever 30 is urged into engagement with toothed wheel 35 by spring 41 secured at one of its ends to pin 42 affixed to said clutch dog and its other end to pin 43 integral with anti-backup cam 34. An anti-backup pawl 44 is provided to insure unidirectional rotation of drive shaft 36. Pawl 44 is likewise pivotally mounted as at 32 and is urged into contact with the outer periphery of cam 34 by spring 45 connected at one end to pawl 44 and at its other end to bracket 28. Reverse rotation of said cam is prevented by virtue of engagement of pawl 44 with shoulder 46 of cam 34. It is thus seen that upon energization of magnet 27, mechanical driving power is transmitted from motor M, through shafts 17, 19, 24, through said clutch 26 to rotate the drive shaft 36 of the pin sensing drive unit 7, the description of which will follow later.

Figure 3:
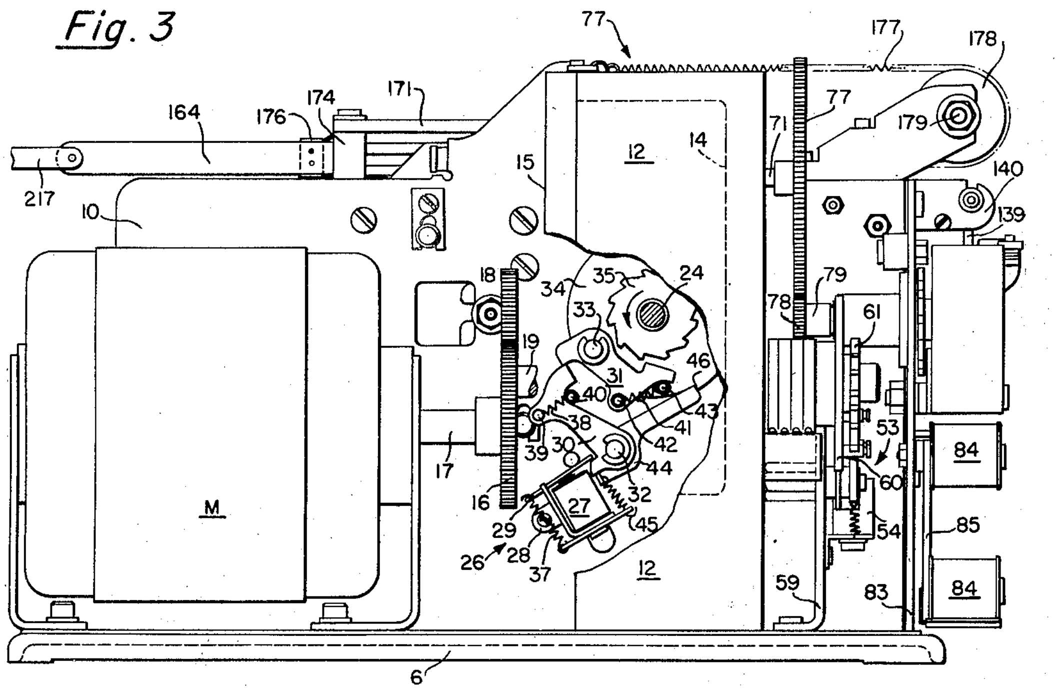
Fig. 3 is a left side elevation of the machine with parts broken away.
Figures 4, 12A:
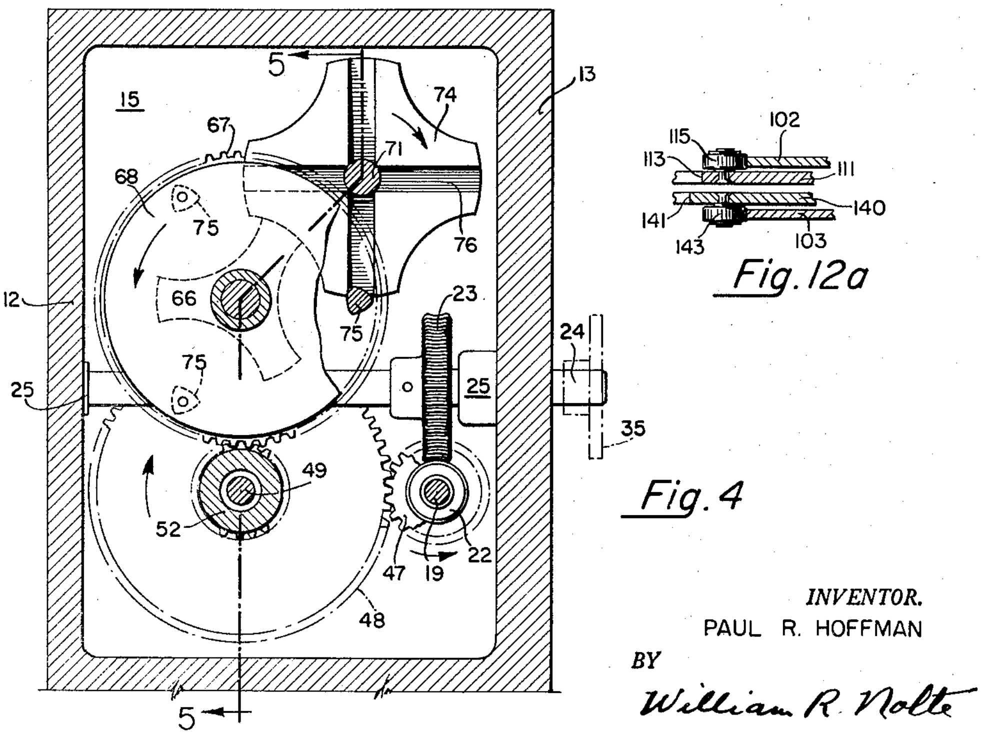
Fig. 4 is a section taken on line 4—4 of Fig. 1.
Fig. 12A is a section taken on line 12A—12A of Fig. 12.
Figure 5:
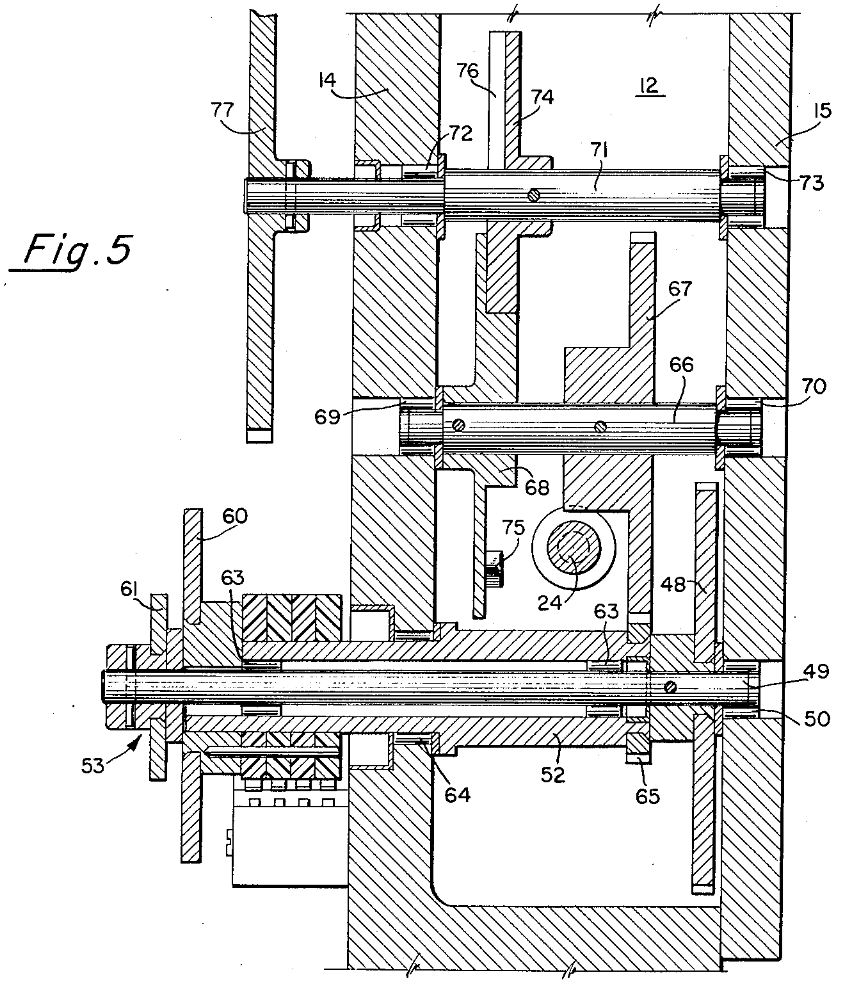
Fig. 5 is a section taken on line 5—5 of Fig. 4.

Mechanical power to advance the tape T is transmitted to gear 47 also fastened to shaft 19, which through gear 48 drives shaft 49, see Fig. 4 and Fig. 5. Shaft 49 is mounted for rotation at one of its ends in upright wall 15 by bearing 50 and at its other end by bearing 63 concentric with and mounted within hollow shaft 52. Power from shaft 49 is transmitted through tape feed clutch 53 adjacent said other end of shaft 49. Clutch 53 (Fig. 2) is similar in operation to the previously described tape sensing mechanism clutch 26 and includes a magnet 54 which when energized pivotally moves its clapper 55 which by said movement strikes stop lever 56 and rotates it clear of the clutch dog 57. Magnet 54, is suitably affixed to clutch bracket 59 which is secured on base plate 6. Stop lever 56 is also mounted for pivotal movement as on pivot 58 on clutch mounting bracket 59. It should be understood that stop lever 56 rotates on pivot 58 of clutch plate 59 in the same manner as the rotation of stop lever 30 of clutch 26 on pivot 32 of plate 10 as seen in Fig. 3. The tape feed clutch dog 57 pivotally mounted on anti-backup cam 60 is pivotally urged into engagement with toothed wheel 61 fastened to the aforementioned rotating shaft 49 by means of spring 62. The anti-backup cam 60 is fixedly mounted to the aforementioned hollow shaft 52. Bearings 63 located within shaft 52, operate to maintain concentric relative rotation between the latter and shaft 49, while bearing 64 supports said hollow shaft for relative rotation with respect to upright supporting plate 14.

As hollow shaft 52 is intermittently rotated by the action of clutch 53, gear 65 affixed to shaft 52 (Fig. 5) drives a Geneva drive shaft 66 through gear 67 secured to the latter shaft. Also fastened to the Geneva drive shaft 66 is the Geneva drive wheel 68. Shaft 66 is mounted at its ends for rotation in bearings 69 and 70 mounted in end plates 14 and 15 respectively. An additional shaft 71 mounted in bearings 72 and 73 has a Geneva driven wheel 74 affixed thereon. One of three teeth 75 of the driving wheel 68 engages in the notches 76 of the driven wheel 74 and turns the latter a distance of one notch or index position with every third of a revolution of the drive wheel 68 thereby providing intermittent advancement of the record which is to be sensed through gear train, a description of which follows. While the present embodiment of the invention utilizes a Geneva movement, it should be understood that other well known mechanical movements may be used in lieu thereof to intermittently advance a record so as to cause the record to be at rest while it is being sensed.

Fixedly mounted on shaft 71 is gear 77 which through gear 78 mounted on one end of shaft 79 (Fig. 1) drives said latter shaft which carries the tape sprocket 80. Shaft 79, it is observed is suitably journalled for rotation to front plate 83. Front plate 83 extends across the front of the record sensing and decoding mechanism 7 and is securely fastened to the aforementioned upright plate 10 and 11 and operates to maintain the latter in spaced parallel relationship. A pair of rollers 84 (Fig. 2) mounted on bracket 85 secured, as seen in Fig. 3, to front plate 83 guide the tape T on one side of said sensing unit 7. The tape T is then passed between top and bottom guide plates 86 and 87 which correspond to the reading position of the mechanism, and is further passed over rollers 88, 89 fixed to front plate 83. Roller 90 mounted for rotation on arm 91 in turn pivotally mounted on front plate 83 as on pivot 92 is urged by spring 93 in a manner to suitably tension the tape T.

Figure 9:
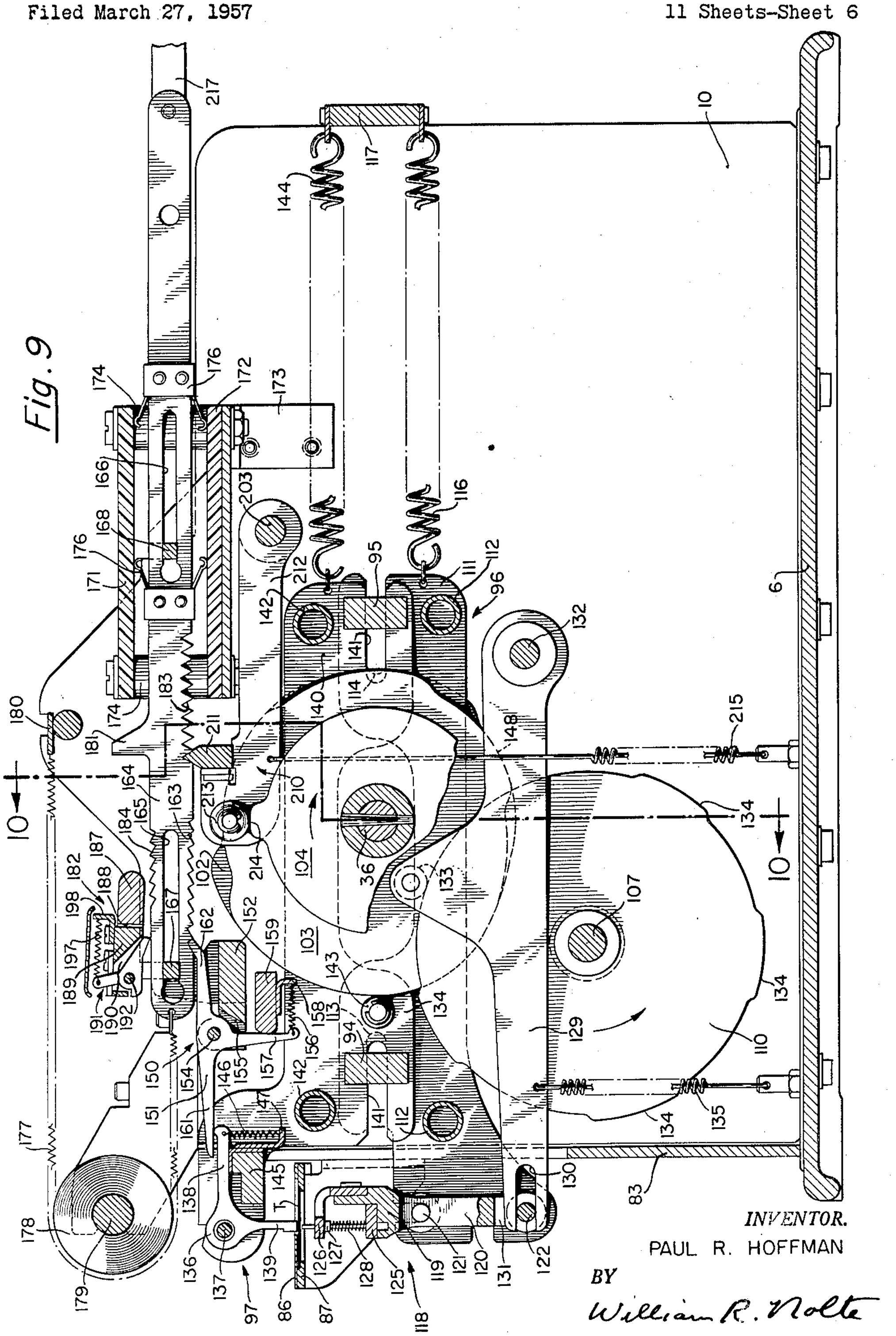
Fig. 9 is a sectional view taken along line 9—9 of Fig. 2 and Fig. 10.
Figure 12:
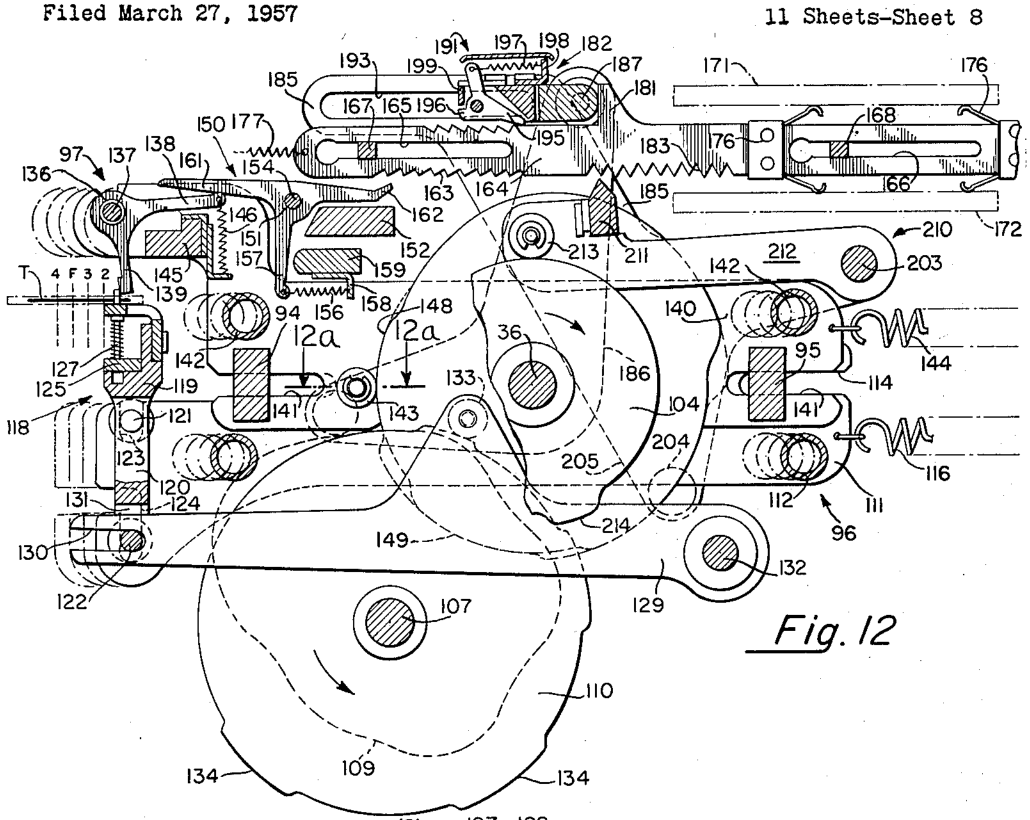
Fig. 12 is a sectional view combining certain elements shown in Figs. 9 and 11 and illustrating the pins sensing a hole in the number one channel of the tape.

Referring to Figs. 9, 10 and 12, the record sensing and decoding mechanism 7 comprises a forward slide guide 94 and a rear slide guide 95, each mounted transversely in upright plates 10 and 11. The slide guides 94 and 95 serve a twofold purpose, i.e., to support said upright plates 10, 11 in vertical alignment, and to guide the sense pin slide assembly 96, shown in Fig. 9, and the interposer slide assembly 97, Figs. 1, 10 and 12 for aligned parallel movement. Each of said slide guides 94, 95 is generally of rectangular stock and have a plurality of notches 98 spaced along their longitudinal dimension, see Figs. 1 and 2.

The pin sensing and decoding unit 7 as previously mentioned is driven by transverse cam shaft 36 which is journalled for rotation at the same elevation and aligned between said slide guides 94 and 95. Bearings 99 mount the drive shaft 36 for rotation in side plates 10 and 11. Clear bail cams 100, see Fig. 10, drive bail guide arm cams 101, sense pin slide cams 102, interposer slide cams 103 and aligning bail cams 104, all affixed to shaft 36 impart motion to various assemblies for purposes which will hereinafter be described. Additionally a gear 105 affixed to said shaft meshes with gear 106 affixed to transverse shaft 107 which is likewise journalled for rotation in upright plates 10 and 11 by means of bearings 108. Drive bail cams 109 and pin sense cams 110 drive additional assemblies.

Driven by the cams 102 is a pair of pin shift slide plates 111 which are maintained in spaced parallel relationship by means of tie bars 112. The total outline of each individual pin shift slide is also clearly shown in Fig. 19. Each slide plate 111 is further horizontally notched as at 113, and 114 at its forward and rear ends respectively and further carries a cam follower 115 which engages the aforementioned cam 102, as seen in Fig. 12A which is a detailed sectional view showing the engagement of the cam follower with the slide plate 111. Springs 116 secured to the rear of the pin shift plates 111 and to a rear cross bar 117 affixed between upright slide plates 10 and 11 insure that the slide plates 111 are at all times in engagement with cams 102 through said aforementioned cam followers.

Figure 2:
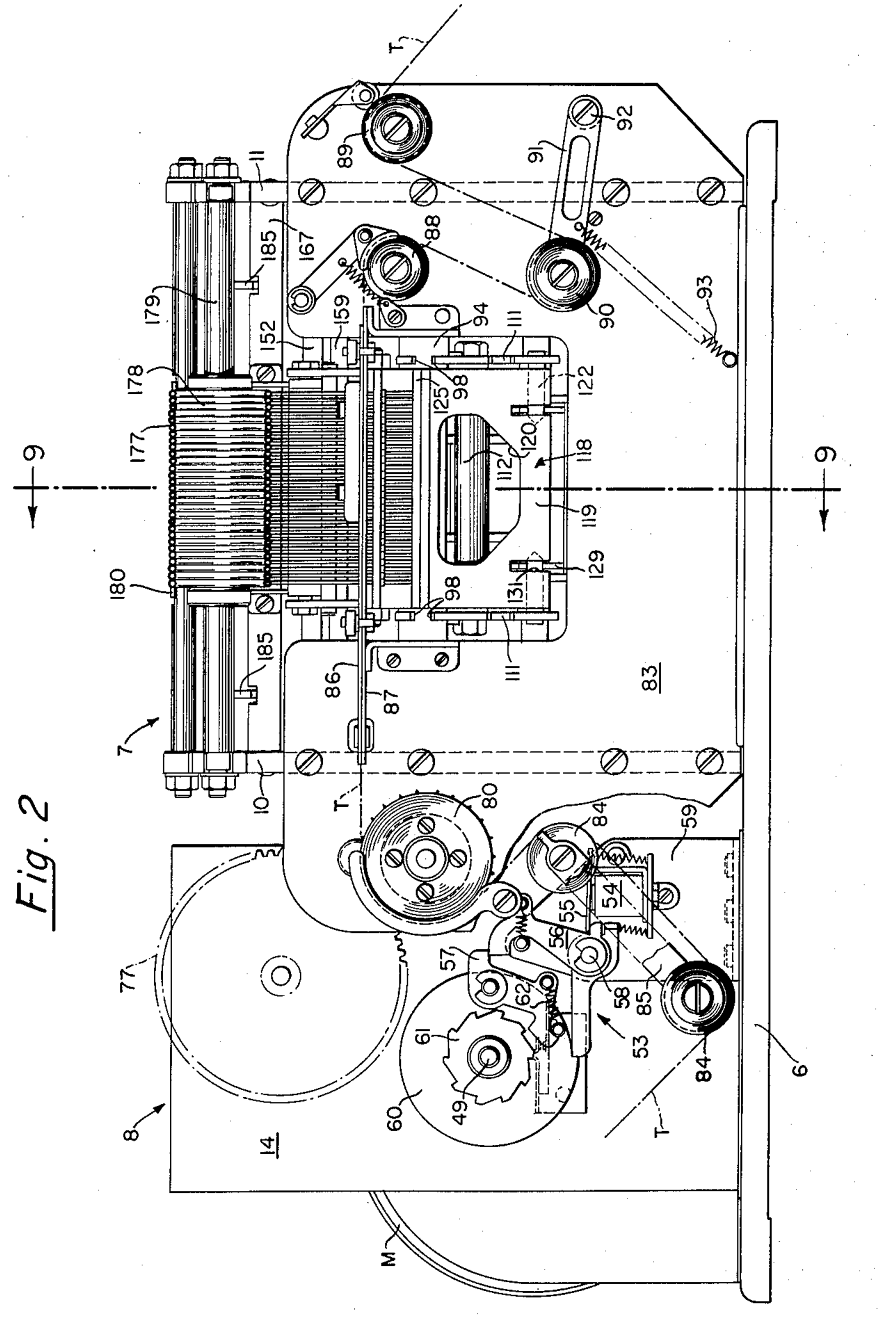
Fig. 2 is a front elevation of the machine.
Figure 6:
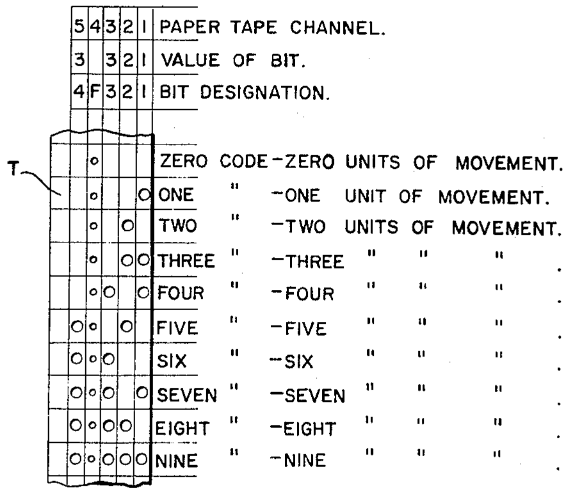
Fig. 6 is a fragmentary view of the tape.

Referring to Fig. 2, the front elevational view, it will be seen that the sensing pin assembly 118 extends the full distance between the plates 111, and includes a pin block 119 having a large central aperture, 120. The pin block 119 has two pairs of pin block studs, top and bottom 121, 122 (Figs. 9 and 13) affixed on its opposite sides. The top studs 121 are received in vertical slots 123 of plates 111, best seen in Figs. 12 and 13, and the bottom studs 122 which are longer than the top are likewise each received in a second vertical slot in alignment with and beneath the first slot, the lower slot being identified by the reference character 124. Pin block insert 125 and flanged retainer 126 above said insert are likewise disposed transversely of said plates 111, and are suitably fastened to pin block 119. A plurality of sensing pins 127 spring loaded by means of encircling springs 128 are slidably mounted in aligned holes top and bottom in said insert and said retainer. In the present embodiment of the invention thirty sensing pins are shown, see Fig. 2, which permit the simultaneous sensing of thirty digits coded on the tape T. The transverse sensing unit 7 employs a four bit additive binary code, see Fig. 6 for the numeric information. Each perforation has a digital significance and the sequence or arrangement of the perforations in the entire row transverse to the channels determines the character significance. The "one" bit corresponding to channel 1 of the tape has a value of one unit of movement; the "two" bit corresponding to channel 2, has a value of two units of movement; the "three" bit has a value of three units of movement; and the feed channel of the tape is used for feed purposes and is designated by "F"; the "four" bit corresponding to the fourth channel also has a value of three units of movement. It will be clear from the following description that the output of the sensing device 7 may be termed parallel reading in serial units of movement.

Tape T is advanced in step by step increments corresponding to the distance between the first and the thirtieth sensing pins (plus one character pitch) of the bank of pins 127. As before mentioned the tape is guided during such movement and retained in position relation to the sensing pin support assembly 118 by means of plates 86 and 87. This can be clearly seen in Fig. 2. The upper end of each sensing pin 127 is adapted to enter axially aligned transverse slots in the plate.

Referring to Fig. 9 again, it can be seen that the pin sensing assembly 118 is mounted for reciprocal vertical movement upon the forward extremities of a pair of pin sense arms 129. The pin sense arms 129 are horizontally notched at 130 at their forward ends and receive the elongated bottom studs 122 of the pin block assembly, note also that the pin block 119 as seen in Fig. 2 is notched as at 131 to accommodate the pin sense arms 129. The rear ends of the pin sense arms are rockably mounted upon shaft 132, the latter being mounted in side plates 10 and 11.

The aforementioned pin sense cams 110 mounted on shaft 107 (Figs. 9, 10 and 12) engage cam followers 133 on said pin sense arms 129. It will further be seen that the pin sense cams 110, refer to Fig. 9, contains four lobes 134 which cause the pin sense arms to be raised and lowered once for each channel position of the tape which is being read.

Springs 135 affixed at one of their ends to said pin sense arms 129 and to said base 6, operate to ensure that the cam followers 133 secured to said pin sense arms engage the aforementioned cams during all periods of rotation thereof.

Examination of Fig. 12, shows cam follower 133 riding on the high part of the first lobe 134 thus causing the pins 127 of the pin sense assembly 118 to be passed through the tape T. The pin sense assembly 118 is in its uppermost position while the pins 127 of the assembly are reading the first channel in the tape T. The interposer slide assembly 97 further has been moved from its most rearward position (from right as seen in Fig. 12) so as to coact with the pins passed through the first channel of the tape. The interposer slide assembly 97 is comprised of a plurality of pivotally mounted interposers 136, one for each sensing pin, and is mounted on cross shaft 137. The interposers 136 are suitably spaced and guided on said shaft for engagement with the tops of the sensing pins which extend through the tape. Each interposer is in the form of a bell crank having a horizontal arm 138 and a vertically depending leg 139. The previously mentioned transverse or cross shaft 137 on which the interposers are mounted is secured at its ends in a pair of interposer slide plates 140.

Figure 19:
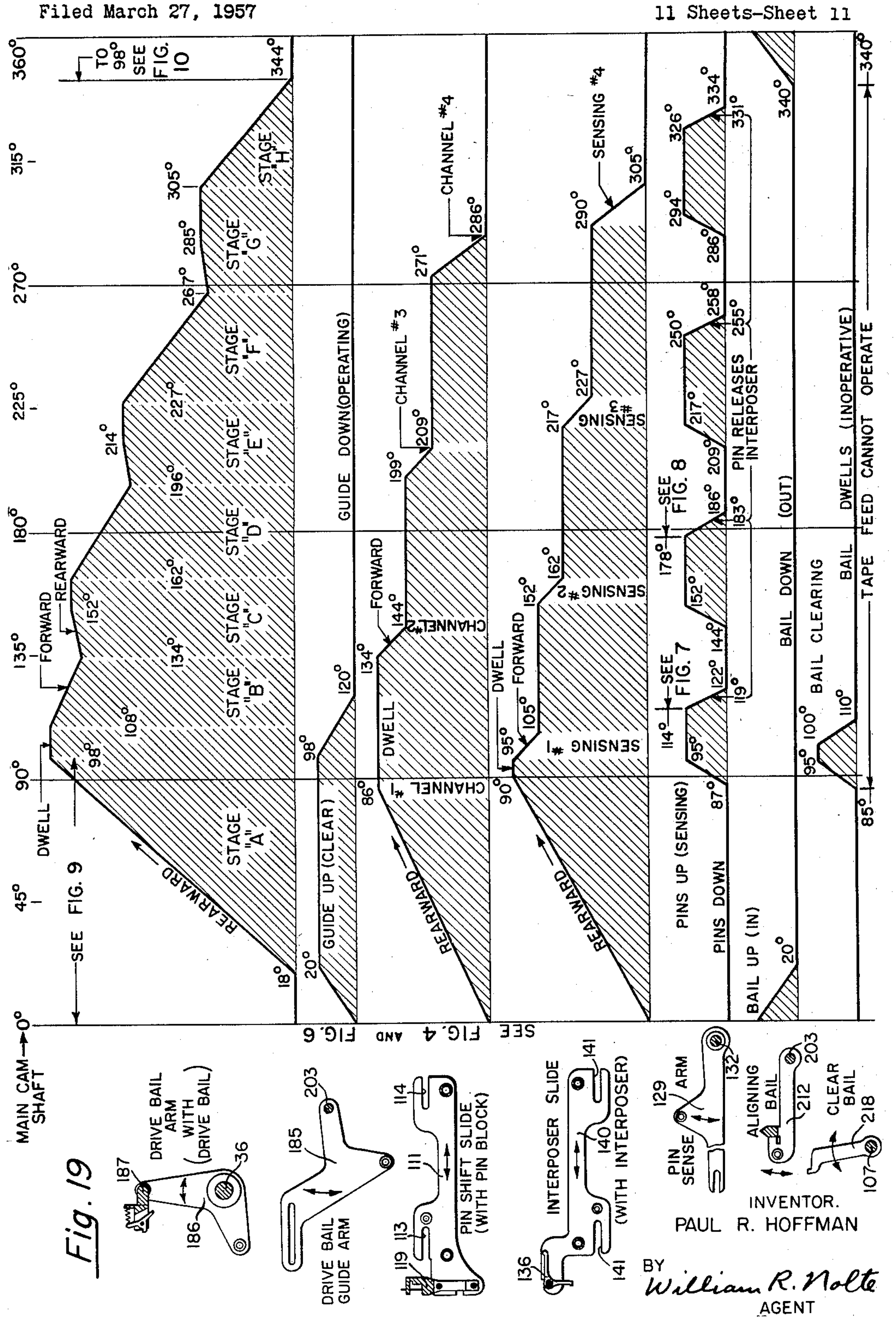
Fig.19 is a timing diagram for the machine.

Referring to Fig. 19, the outlines of the interposer slide plates 140 are as in the case of the pin shift slide plates, shown as being elongated in form, each having a pair of horizontal slots 141 at both its forward and rear ends. The interposer slide plates are secured in spaced parallel relation by a pair of tie bars 142 mounted by virtue of said slots in the transverse slide guide 94, 95 (see Figs. 9 and 12). Each of said interposer slide plates has mounted thereon a cam follower 143 which engages interposer slide cams 103 seen mounted upon shaft 36 in Fig. 10, see Figs. 9 and 12A also. Springs 144 urge the cam followers 143 in engagement with cam 103 during the entire rotational cycle of the latter.

Figure 13:
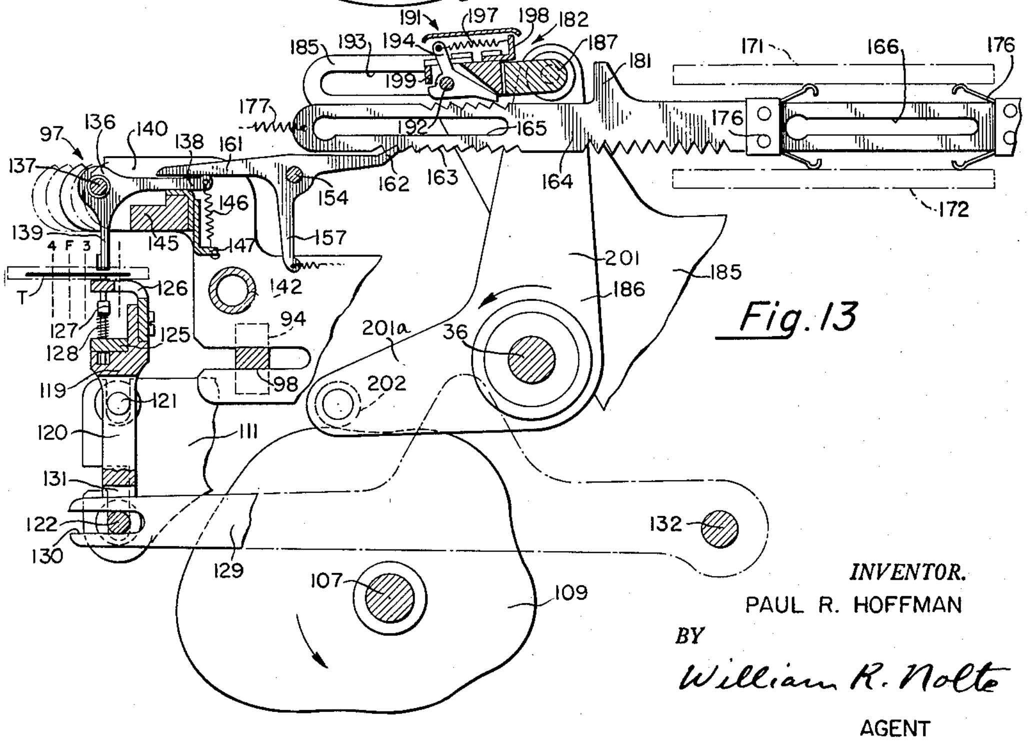
Fig. 13 is similar to Fig. 12 but showing the sensing pins in alignment with the second channel of the tape with a no hole condition.

A spacer bar 145, Figs. 9, 12, 13, is likewise disposed transversely across the forward ends of said interposer slide plates and secured thereto. This spacer bar operates to seat the interposers in their normal positions. Each interposer has a spring 146 secured to the extremity of its horizontal arm 138. The springs in turn are secured to a bracket 147 mounted to said spacer bar. As seen in Fig. 12, the interposer assembly has been moved from its most rightward position to its first leftward or forward position which corresponds to its channel one position. The interposer 136 is shown as being rotated by virtue of the fact that its depending leg has struck the top of the sensing pin 127 projecting through tape T. Also shown in Fig. 12 is the relationship of the interposer slide cam follower 143 of the said lever slide as riding on the first rise 148 of the cam 103. It will further be apparent that rotation of said cam will cause the follower to ride up on the next successively higher lobe of said cam and thus move the interposer assembly forward to its second channel position.

Mounted above and slightly to the rear of said interposer assembly 97 is a rack pawl support assembly 150, Fig. 9, which is comprised of a bank of thirty decimal rack pawls 151 pivotally mounted upon support 152. The latter support extends transversely between said slide plates 10 and 11 and is secured to said plates by bolts 153. (See Fig. 1.) The rack pawls 151 are mounted on said support for pivotal movement by transverse pivot pin 154; each of said pawls is received in a complemental slot 155 milled into said support. The slots are so spaced as to uniformly position the pawls in alignment with the horizontal arm 138 of said interposers 136. Each of said pawls is moreover generally T-shaped and is mounted on the aforementioned pivot shaft at the intersection of its horizontal and vertical portions. A plurality of springs 156 urge said pawls 151 in a counterclockwise direction. Each of said springs is connected at one of its ends to the extremity of vertical portion 157 of said pawls and at its other end to a bracket 158 which is affixed to the clear bail 159 of the clear bail assembly 160. The function of the latter is to be hereinafter discussed. The portion 161 of said pawl to the left of the pivot connection is adapted to be engaged on its under surface by the horizontal 138 of interposer 136. The portion 162 of said pawl to the right of said pivot connection normally engages a first set of uniformly or decimally spaced teeth 163 of its corresponding decimal rack 164. When, however, the bank of interposers is moved to the left, as seen in Fig. 12, and the interposers are caused to strike the tops of those pins passed through holes in the tape in a given channel thereof, the interposers are rocked about their axes and caused to correspondingly rock the pawls to thereby disengage the pawls from engagement with their corresponding decimal rack 164.

The outlines of the decimal racks 164 are clearly shown in Figs. 9, 12 and 13. Each rack is elongated in form and has a pair of horizontal longitudinal slots 165, 166 disposed along its length. As in the case of the aforementioned interposers and rack pawls, the number of said racks correspond in number to the number of said sensing pins. A pair of rectangular slide guide members 167, 168 suitably mounted transversely between side plates 10 and 11, are passed through the slots 165, 166 of the decimal racks. Reference to Fig. 10 shows the aforementioned slide guide members as being generally comb shaped along their top and bottom edges. The teeth-like elements 169 of the comb operate to maintain the racks in the slots 170 formed by said elements for aligned parallel movement of said racks.

As seen in Fig. 9, a pair of circuit panels 171, 172 are disposed above and beneath the rearward portion of said decimal rack bars. These circuit boards or panels are disposed in parallel relationship and maintained in such relationship by means of brackets 173 affixed to side plates 10 and 11 and by spacer elements 174 passed therebetween. Reference to Fig. 7 shows the electrically conductive circuit paths 175 of said circuit panels. It will be further noted that the racks have wiper contacts 176 affixed to their top and bottom rear edges which slide along the successive electrically conductive paths on the aforementioned printed circuit boards upon movement of said rack bars. Each decimal rack is normally urged to the left or forward as seen in Fig. 9 by means of a spring 177 affixed to its forward edge. The spring is passed over a pulley 178 mounted on transverse shaft 179, the ends of which are affixed to side plates 10 and 11. The opposite end of the spring is affixed to bracket 180 also disposed transversely between side plates 10 and 11. Each decimal rack 164 has an upstanding ear 181 disposed along its length which engages drive bail assembly 182 in a manner and for the purpose which will be hereinafter described. Disposed along the lower edge beneath said ear 181 and to the right of said first set of teeth 163 are a second set of decimally spaced teeth 183 utilized for alignment purposes. A third set of teeth 184 comprising six in number, are disposed along the top edge and forward of said upstanding ear.

Fig. 12 shows a hole being sensed in the first channel of the tape T. The pawl 151 has been rotated clockwise by virtue of the counterclockwise movement imparted to the interposer 136 and the pawl 151 has been disengaged from the teeth 163 of the rack thus permitting the aforementioned spring 177 to urge the ear 181 of the rack bar into engagement against the drive bail assembly 182.

As seen in Figs. 1, 9, 14 and 15, the drive bail assembly 182 extends transversely between the drive bail guide arms 185 and the drive bail arms 186. The drive bail assembly includes a drive bail 187 notched as at 188 and receives an insert 189 in said notch. The insert is comblike in form and adjacent teeth 190 thereof position and support a plurality of latches 191, one for each decimal rack 164. A long pivot pin 192 mounts said latches for pivotal movement between said teeth. The long pin further secures the insert in said bail and the drive bail 187 within horizontal slots 193 of said drive bail guide arms 185 (Fig. 11).

Figure 14:
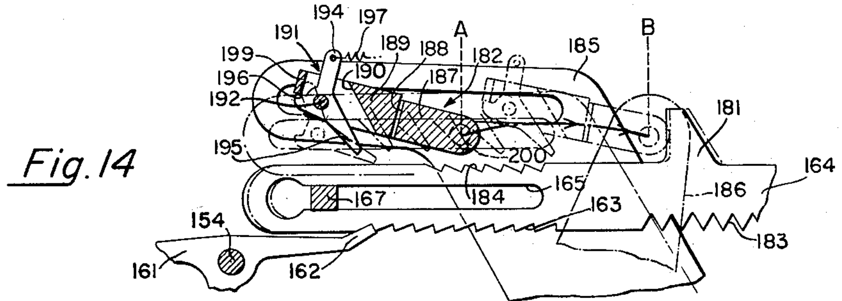
Fig. 14 is a view showing the relationship of the drive bail and a given rack bar after the corresponding sensing pin of the latter has transversely scanned the tape to read a "zero"
Figure 15:
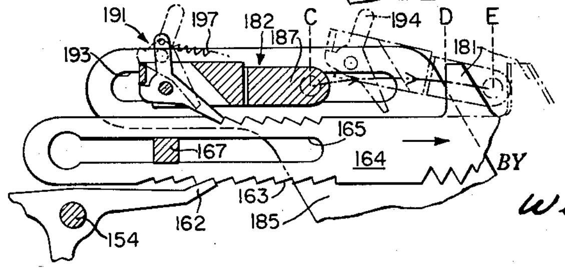
Fig. 15 is a view similar to Fig. 14 showing the relationship of the drive bail to a rack bar after the corresponding pin of the latter has transversely scanned the tape to read a "three"

Referring to Figs. 14 and 15, each latch is in the form of a bell crank having an upright arm 194 and a downwardly angularly disposed leg portion 195, and includes a projecting shoulder portion 196 adjacent its pivot, see also Figs. 12 and 13. Each upright arm portion 194 of each latch is urged by means of a spring 197 into clockwise rotation. The other end of said spring is affixed to a bracket 198 (Fig. 9) suitably secured to said insert member 189. A stop member 199 extending across the front of said insert 189 and secured thereto operates to limit the clockwise rotational movement of said latches due to the action of said aforementioned spring.

Figure 11:
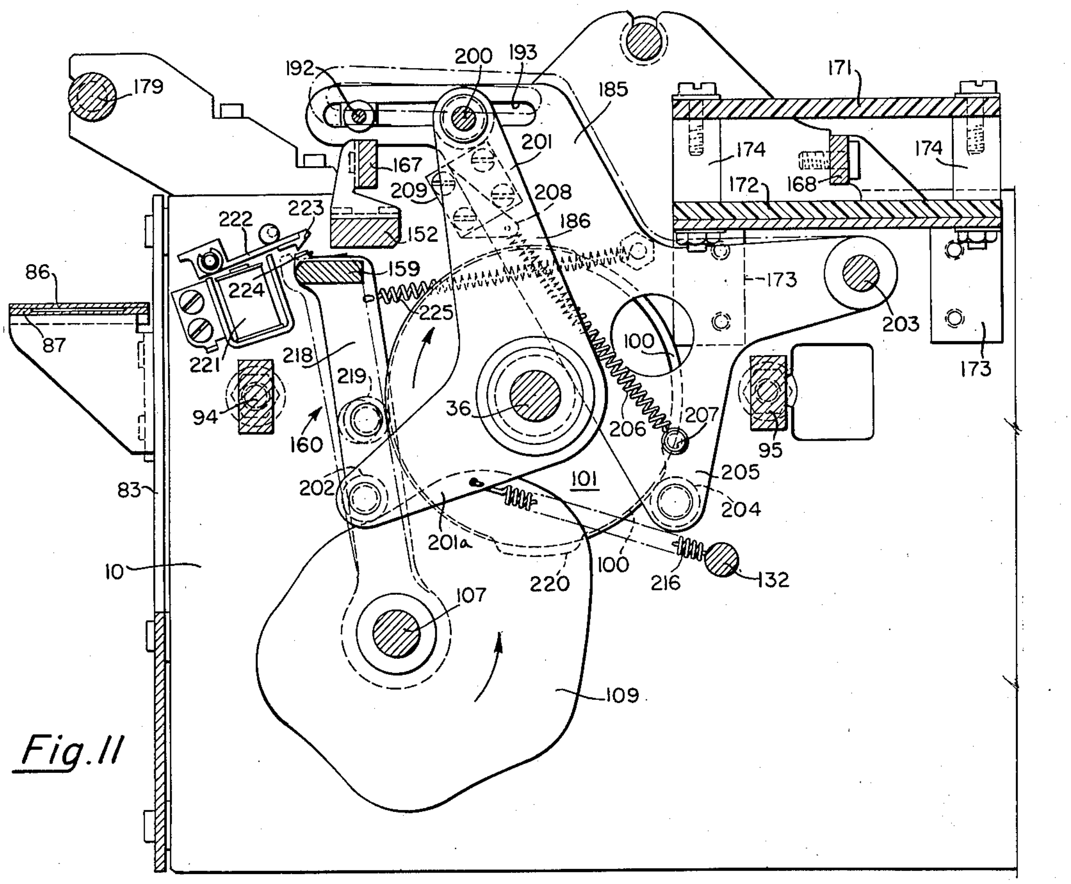
Fig. 11 is a sectional view taken along the line 11—11 of Fig. 10.

Referring to Figs. 1, 11, 12 and 13 it should be understood that the drive bail assembly 182 is driven by the pair of drive bail arms 186 and guided by the pair of drive bail guide arms 185. A pair of studs 200 secure the rear portion of the drive bail assembly to the drive bail arms 186. The outlines of the drive bail guide arms 185 and the drive bail arms 186 are shown in Fig. 11. Each drive bail arm 186 is in the form of a bell crank and the upright arm 201 thereof has mounted therein the aforementioned pivot stud 200. The depending leg of said drive arm carries a cam follower 202 which engages cam 109 while the upright arm is caused to move the aforementioned studs 200 in a generally fore and aft direction following an arcuate path AB shown in Fig. 14. Since the drive bail assembly is affixed transversely between the drive bail arms by virtue of studs 200, the assembly is consequently driven fore and aft by such movement. The drive bail guide arms 185 are mounted on shaft 203 for pivotal movement. The ends of said shaft are fixed in plates 10 and 11. Cam follower 204 suitably mounted on arm 205 engages cam 101 and transmits pivotal motion to said guide arms at the beginning of the reading cycle in a manner to be later described. A spring 206 urges said cam follower into engagement with said cam. The spring is affixed at one of its ends to a stud 207 secured to said guide arms and at its other end to a bracket 208 suitably mounted to a guide block 209 affixed to upright plates 10 and 11. A slot 209*a* is provided in guide drive bail guide arms.

After all of the channel of the tape have been read and prior to resetting the racks to their most rightward or original staring position, it is necessary to disengage the drive bail latches 191 from the decimal racks 164. The motion of the drive bail assembly during its disengagement can be observed in Figs. 11, 14 and 15. Referring first to Fig. 14, it is seen that the rack has not been moved throughout the entire reading cycle. In other words, the pin sense assembly 118 has transversely scanned all four channels of the tape and the particular rack 164 shown has experienced no forward movement due to the fact that no holes were present in the tape. The latch 191 having depending leg 195 is shown in phantom riding along the top edge of the decimal rack 164. Rotation of the drive bail guide arm 185 from its phantom line position to its full line position has caused the latch 191 to be lifted from the decimal rack and has rotated the drive bail 182 so that it is canted with respect to the elongated horizontal slot 193 of the drive bail guide arm 185. This follows because the pivot studs 200 are affixed to the drive bail arms 186 as seen in Fig. 11, while the latches 191 by the transverse pivot shaft 192 are raised by the clockwise movement canted with respect to the elongated horizontal slot 193 of the drive bail guide arm 185. As the drive bail arms are rotated by cams 109 (see Fig. 11) the aforementioned studs 200 are caused to follow the arc A—B shown in Fig. 14. It is thus seen that the drive bail is restored to its original position i.e., one in which the drive bail is in engagement with the ear 181 of the decimal rack.

Fig. 15 illustrates a similar action of the drive bail assembly 182. Note, however, in this figure that the decimal rack in its full line position has been moved three units to the left, which means that its particular sensing pin has read a "three" from the tape. The rack pawl is shown in its number "three" notch. The drive bail latch 191 is shown in full line position in engagement with the leftmost tooth of the top row of teeth on the decimal rack. As previously described a clockwise rotation of the drive bail guide arms 185 will cause the latch 191 to be raised to the phantom line position shown, corresponding to that shown in Fig. 14. Subsequent rotation of the drive bail arms (see Fig. 11) will cause the drive bail to be moved to follow the arc CDE. Upon completing movement between the arc CD, however, the drive bail engages ear 181 of the decimal rack and commences at the point D to move the ear and the rack through the distance DE. The ear 181 shown in phantom position indicates the decimal rack restored to its original position and ready for a new reading cycle.

At the conclusion of the reading cycle, an aligning bail assembly 210 as seen in Figs. 9 and 12 engages the second set of teeth 183 disposed along the bottom edges of said decimal racks. This action compensates for the accumulation of tolerances in the movement of the drive bail assembly and insures that there is no misalignment of the wipers 176 relative to conductive paths 175 on panels 171 and 172 and locks the racks in this position. The aligning bail 211 is mounted between a pair of aligning bail arms 212 which in turn are mounted at their rear ends for pivotal rotation about the axis of the aforementioned shaft 203, which is fixed between upright side plates 10 and 11. Cam followers 213 mounted at the forward ends of said arms, engage cams 104 mounted upon main cam shaft 36. The cam follower 213 is shown riding on the projecting lobe 214 of said cam 104 which has accordingly raised the aligning bail 211 into engagement with the teeth 183 of the decimal racks. A spring 215 affixed at one of its ends to the forward portions of said aligning arms 212 and at its lower end to said base plate 6 insure that the cam follower is maintained in engagement with cam 104 throughout its entire cycle of rotation.

In a similar manner, as can be seen in Fig. 11, spring 216 is affixed at one of its ends to depending leg 201*a* of drive bail arm 186 and is affixed at its other end to shaft 132.

Additional structure is provided for overriding the pin control or reading function of the mechanism. This necessitates that the normal reading elements must be held in abeyance under certain conditions when the decimal racks are to be positioned by external means to reflect newly inserted information not recorded in the tape. Consequently, early in the cycle, and before the pins start to sense, the clear bail 159 is operated. As seen in Figs. 9, the clear bail 159 must be moved forward and in a manner to rotate the rack pawls 151 clockwise to thereby disengage the rack pawls from their corresponding racks so that they can be set up by the external links 217 affixed thereto, Fig. 9. As seen in Figs. 10, and 11 the clear bail 159 is shown mounted transversely between the clear bail arms 218 which are mounted for pivotal movement upon shaft 107. A cam follower 219 suitably mounted along the length of each clear bail arm 218 engages clear bail cams 100 affixed to the main cam shaft 36. Springs 225 affixed at one of their ends to side plates 10 and 11 and at their other ends to the top portions of said arms, urge the cam follower 219 into engagement with the clear bail cam 100. Bearings 108 permit pivotal movement between said arms and shaft 107. As seen in Fig. 11 the clear bail cam 100 operates by virtue of a rise 220 in said cam to move said clear bail arm counter-clockwise or to the left. As a consequence, all of the pawls 151 are rocked clockwise about their pivot 154, thus disengaging all of said pawls from the teeth 163 of the decimal racks 164. The cam 100 immediately drops off again and all of the pawls are permitted to re-engage their respective decimal racks, unless the clear bail latch magnet 221, suitably affixed to plate 10 operates. The clapper 222 of the magnet has a latching surface 223 which engages with a complemental latching surface 224 on the clear bail arm 218 which prevents it from returning to the right (see Fig. 11). If the magnet is pulsed, the clapper is drawn into latching position. This clears the pawls 151 for a cycle of operation and the clear bail 159 remains latched until the following cycle when the magnet again has the choice by either remaining in latched position or freeing the clear bail levers for a regular or normal reading operation.

*Operation*

At the end of the machine cycle, whatever number was sensed or read from the tape was left in the racks, i.e., the racks in the machine are positioned corresponding to the number sensed in the tape. All four "yes" or "no" answers corresponding to "hole" or "no hole" conditions in the tape must be read before a particular character is established.

Consequently, the first step of the cycle is to clear the machine, see stage A of the timing diagram of Fig. 19. In doing this the drive shaft imparts rotation to the drive bail cam 109 thereby causing the drive bail assembly 182 to move to the right. In so doing it restores all of the racks to their most rightward position. The springs 177 affixed to the racks are completely stretched and the racks are in position along the line O—O, Fig. 16. Also the pin shift cams 102 and interposer slide cams 103 upon rotation thereof cause the sense pin slide assembly 96 and the interposer slide assembly 97 to shift to the right, while the pin sense arms 129 are in their down position.

Figure 16:
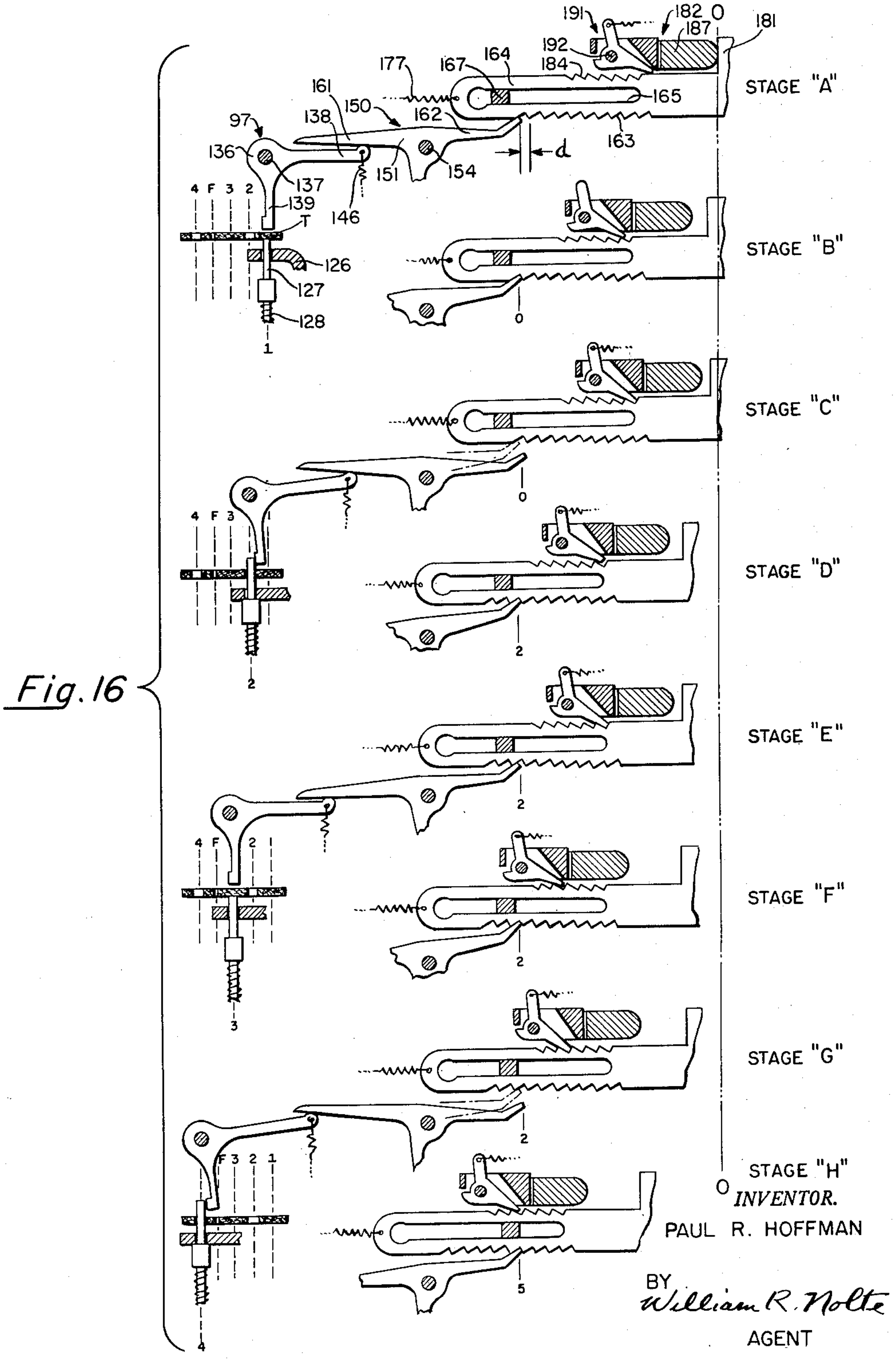
Fig. 16 illustrates the movement of a given rack for a "five" reading in the tape.

Assume that the digit "5" represented by holes in the second and fourth channels of the tape is sensed, refer to Fig. 16. The rack bail 182 holds the rack back to line O—O so that the pressure is off the pawl 151. As seen in stage A the tip of the pawl 151 is removed from the first tooth of the rack an increment or distance *d*. It is evident that since there is no hole in the first channel of the tape, the tape causes the sensing pins 127 to move down relative to the sensing pin assembly 118, see Fig. 9, against the action of springs 128. Therefore when the interposer slide assembly moves left, the interposer 136 mounted thereon does not rotate the pawl 151 which remains in engagement with its corresponding rack and permits no forward movement of the rack. During stage B, the bail steps to the left one unit. This represents one tooth length, i.e. the pitch between the teeth 163 on said rack.

Note in stage B that the bail has left the ear of the rack and that the latch has partially dropped into the first notch of the top set of teeth. As the cycle continues, the pin sense arms 129 move the sensing pin support assembly 118 down and out from its sensing position to its non-sensing position. At this point the sense pin slide assembly 96 begins to move the sensing pin support assembly forward to channel two of the tape to place the sensing pins in alignment with the "2" bit of the tape.

Referring to stage C it is observed that a hole exists in the second channel of the tape and that the pins sense arms 129 have moved the sensing pins 127 up through said hole. The drive bail however through means of latch 191 in anticipation of another sensing operation, however, has moved rearward to drive the rack rearward so that the pressure is again off the pawl. Leftward or forward movement of the interposer slide assembly causes interposer 136 to strike the top of the pin 127 passed through the tape, and thereby rotate counterclockwise to correspondingly rotate pawl 151 clockwise to disengage the latter from the teeth of the rack. Referring now to stage D, it is seen the drive bail 187 now moves two units to the left since the second channel is being read. The rack 164 is thereby permitted to likewise move two units to the left under the action of spring 177 secured at its forward end urging the rack into engagement with the pawl. However just prior to completion of the leftward or forward movement of the bail, the sensing pins are withdrawn and the pawl re-engages the rack in its second notch. It should be noted that the drive bail cam 109 has a rise of two units, see Fig. 11 and also Fig. 19, so that the drive bail is moved two units corresponding to the value of bits attributable to the second channel. Notice also that the latch 191 on the drive bail assembly 182 is partially in the first notch of the upper set of teeth 184 and it is to be understood that the wiper contacts on the rack are moved across their respective printed circuits to their second contacts.

Continuing the cycle and referring to stage E, the bail is moved to the right a fraction of a unit to again remove pressure from the pawl. Proceeding to read the "3" bit of the tape it is seen that no hole exists in the third channel. The tape depresses sensing pin 127 against the action of its spring. The interposer is moved to the left upon completion of the upward movement. The interposer retains its normal position and does not in this instance rotate the pawl 151 which remains in engagement with the racks. As seen in stage F the drive bail now steps three units to the left, while the latch 191 trips over and drops into the fourth notch of the top set of teeth 184, thereby establishing a new physical reference between the drive bail and the rack. Instead of the reference being the front of the bail and the ear of rack which condition existed prior to reading the first channel, the latch 191 now becomes the reference with respect to the ear of the rack rather than the front of the bail. It is further noted that the drive bail latch is capable of movement in one direction of overriding the top teeth on said rack, but movement in the opposite direction is prevented by the latch dropping between said teeth and arresting the motion of said rack, thus establishing the aforementioned new relationship between the rack and the bail.

Referring to stage G the drive bail is again moved a fraction of a unit to the right to relieve pressure from the pawl for its disengagement from the rack. In this instance a hole exists in the fourth channel. Consequently the pawl 151 is rocked clockwise to accomplish disengagement from the rack. In stage H the drive bail now moves forward again and permits the racks to be moved three more units. It is observed again, see the timing diagram, that just prior to completion of the three units of forward movement of the drive bail, the sensing pins are withdrawn to their down position which action permits the pawl to reengage the rack in its fifth notch. After reading the fourth channel and prior to restoration of the racks to their original positions, the aligning bail 211, see Fig. 9, comes in by engaging all of the racks by means of teeth 183, as before described, thereby concluding the cycle.

Figures 17, 18:
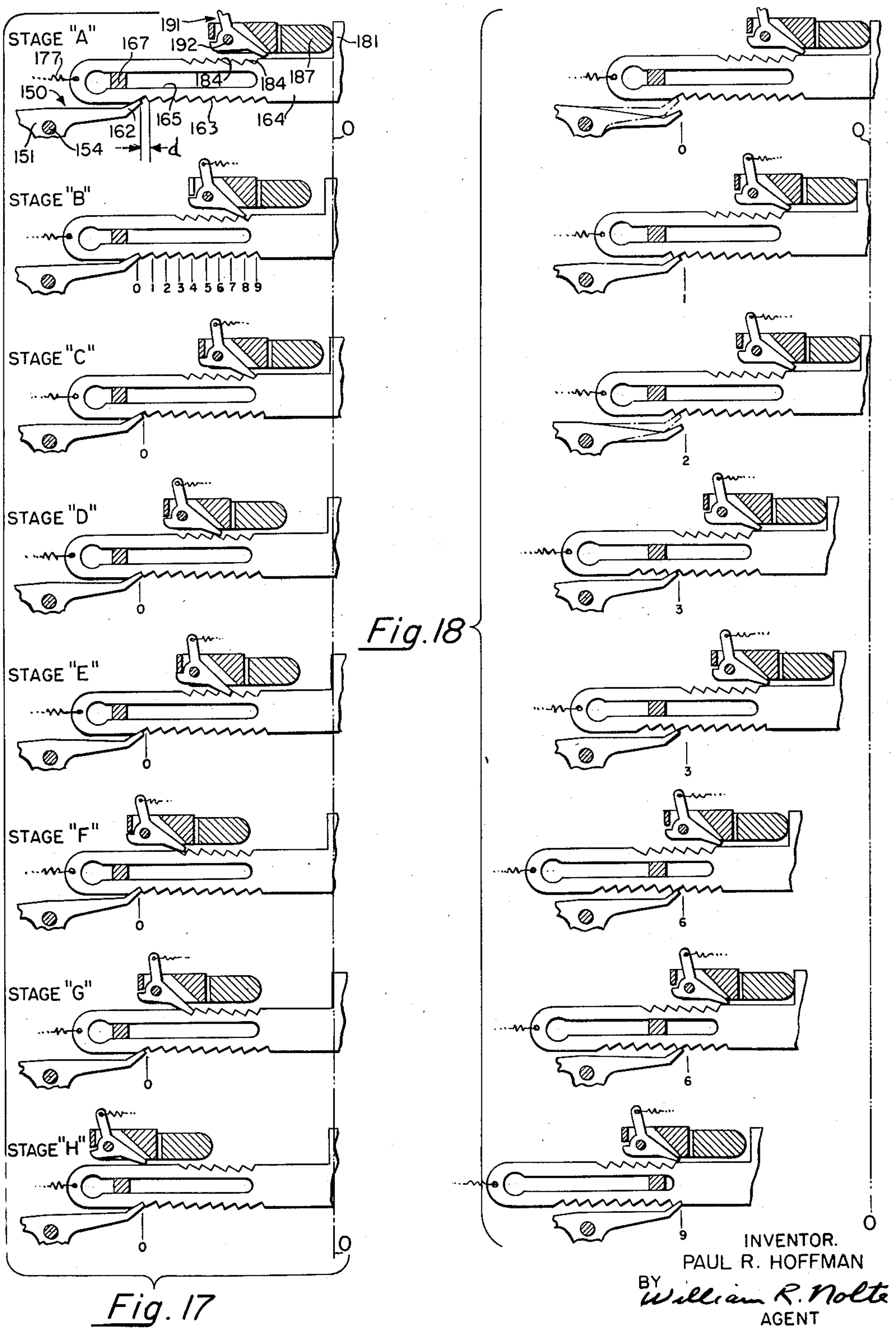
Fig. 17 illustrates the movement of a given rack for a no hole or "zero" digit reading of the tape.
Fig. 18 is similar to Fig. 16 but illustrates the net relative movement of a rack for a "nine" digit reading in the tape.

Fig. 17 shows the relative movements existing between the rack 164 and drive bail assembly for a "zero" tape reading, i.e. one in which no hole is encountered across the entire width of the tape. It will be observed that a reference line O—O is indicated on the right hand side of the figure. The "zero" reading means that the pawl should remain engaged in its "0" notch. Stage A shows the rack as having just been restored and additionally shows a clearance of a fraction of a unit from the pawl and the first tooth the distance *d*, and that the drive bail latch 191 is riding on the top edge of the rack.

Stage B shows that the drive bail 187 moved to the left one unit as before mentioned when reading the first channel. Because the pawl was not rotated out of engagement with the lower teeth of the rack the latch 191 slid along the edge of the rack and dropped into the first notch.

In stage E, the bail 187 has backed off or moved to the right to provide clearance between the pawl and the first lower tooth of the rack in order to facilitate ready disengagement. Being "0," no pin was sensed by the interposer and no rotational movement was imparted to the pawl. In stage D the drive bail now moves two additional units to the left and the latch trips over two additional top teeth. The third and fourth channels represented by stages E through H are identical except that the bail moves three units for the third channel and three units for the fourth channel. It is thus seen that the pawl is not tripped but rather remains in engagement with the rack in the zero notch during the entire portion of the reading cycle.

Fig. 18 shows the net displacement of a rack bar corresponding to the reading of a "9." In this example, holes exist in all four channels of the tape. Referring to stage A the pawl 151 leaves the phantom line position and is rotated to its full line position upon sensing the hole in the first channel. The bail 187 moves to left one unit as seen in stage B and the pawl is urged to engage the rack in the first notch formed by teeth 163. The springs 177 affixed to the rack 164, see Fig. 9, keep the ear of the rack into engagement with the bail 187. The reading of channels "two," "three" and "four" are identical with the first channel except that the bail will move two units for the second channel, three for the third, and three for the fourth. It will be observed that the latch 191 does not operate to limit the movement of the rack in the reading of a nine.

In conclusion it is observed that the racks by means of the wipers affixed thereto slide along the successive contacts of the printed circuit panels and permit reading out of said contacts electrically. In another words, the number or digit which is represented in binary code by means of punched holes in the tape is transferred by mechanical movement of the rack for electrical readout in decimal form.

While I have described what I consider to be a highly desirable embodiment of my invention, it is obvious that changes in form could be made without departing from the spirit of my invention and I therefore do not limit myself to the exact form herein shown and described, nor to anything less than the whole of my invention as above described and as hereinafter claimed.

What is claimed is:

1. In a sensing and decoding apparatus, means for advancing a record medium, said record medium being coded by perforations in a plurality of channels parallel to the direction of feed of said record medium, sensing pins oriented in parallel arrangement with the parallel disposed channels of markings in said record medium, means for successively moving said sensing pins as a group transversely to said record medium and adjacent to one surface thereof and for causing said pins to dwell successively in alignment with each perforation channel in the record as said pins move across the record, means for bodily moving said sensing pins as a group toward the record during each dwell period to cause the ends of ones of said pins corresponding to perforations in said channels to be passed therethrough to the other surface of said record, the remaining pins not in alignment with perforations in the record being restrained to remain adjacent said one surface thereof, rack means mounted for movement adjacent the other surface of said record, means for moving said rack means, latch means normally in engagement with said rack means to lock the latter against movement and movable into engagement with the ends of those sensing pins passed through said perforations to release said rack means for movement, and stop means normally engaging said rack means and movable a predetermined distance corresponding to the value of the perforation being sensed thereby limiting the movement of said rack means a like amount.

2. In a sensing and decoding apparatus as defined in claim 1 and including electrical circuit means disposed adjacent said rack means, and means responsive to the movement of said rack means for selectively actuating said electrical circuit means.

3. In apparatus for sensing and decoding information from a record on which the characters comprising the information are represented by code perforations in bit form and representing a plurality of decimal digits, said perforations being variably positioned on the record and disposed in rows and channels thereon, a sensing pin mounted for movement along a row to pass through successive perforations in the row, an interposer, means for moving said interposer into engagement with the end of said sensing pin when the latter is passed through a perforation so as to move said interposer from an inoperative to an operative position, a rack mounted for movement from an initial position to a position corresponding to the decimal value of the perforation sensed, means for moving said rack, pawl means in one position engaging said rack to lock said rack against movement and movable to a second position by said interposer upon movement of the latter to its operative position to release said rack for movement, and means movable in one direction to limit the movements of the rack through predetermined distances corresponding to the decimal values of the perforations being sensed and movable in another direction to return said rack to its initial position.

4. In apparatus as defined in claim 3 and including electrical circuit means adjacent said rack means, and contactor means affixed to said rack means for selecting electrical circuits upon movement of said rack means corresponding to the value of each perforation sensed.

5. In apparatus for sensing and decording information from a record on which the characters comprising the information are represented by code perforations in bit form and representing a plurality of decimal digits, said perforations being variably positioned on a record and disposed in rows and channels thereon, a column of sensing pins oriented in parallel relation with said channels and adjacent one surface of said record, means operable for causing relative transverse stepping movement between said sensing pins and said record, means for moving said sensing pins to pass the ends of ones of said pins through said perforations, rack means movable from an initial position to positions corresponding to the decimal values of the perforations sensed, means for moving said rack means, ratchet means associated with said rack means to normally lock said rack means against movement, means movable into engagement with the ends of those pins passed through said perforations and said ratchet means to move the latter out of engagement with said rack means to release the same for movement, and stop means shiftable in one direction to limit the movement of said released rack means a predetermined distance corresponding to the decimal value of the perforation which is sensed, and movable in another direction to return said racks to their initial positions.

6. In apparatus defined in claim 5 including normally open electrical circuit means, and wherein said rack means includes electrical contacts affixed thereto which upon movement of said rack complete an electrical circuit corresponding to such movement.

7. In apparatus for sensing and decoding information from a record on which the characters comprising the information are represented by code perforations in bit form and representing a plurality of decimal digits, said perforations being variably positioned on the record and disposed in rows and channels thereon, a single column of sensing pins oriented in parallel arrangement with the channels of perforations, means for successively moving said column of sensing pins as a group transversely to said record to position said pins in alignment with said perforation channels, means for moving said column of sensing pins so as to cause ones of said sensing pins to pass through perforations in said channels, a plurality of pivotally mounted interposers adapted to be moved into engagement with the ends of those pins passed through said perforations whereby said interposers are rotated from an inoperative position to an operative position, a plurality of racks each mounted for movement along its longitudinal dimension from an initial position, a plurality of pawl means in one position engageable with said racks to lock said racks against movement and rotatable to a second position by engagement with said interposer upon rotation of the latter to said operative position to release said racks for movement, means for moving said released racks, stop means shiftable in one direction to limit the movement of said released racks a predetermined distance corresponding to the decimal value of the perforation sensed, and movable in another direction to return said racks to their initial positions, said stop means including latch means pivotally mounted thereon, said latch means movable in one position thereof due to relative movement of said stop means with respect to said rack means whereby said latches override said rack means, and movable to a second position to thereby engage said racks to arrest motion of said racks, and means for moving said latch means to said second position.

8. In a device for sensing markings on tape and the like, the combination of a plurality of racks each mounted for movement in its longitudinal dimension, a plurality of pawls each associated with a different one of said racks and releasably engageable with its respective rack to hold it from movement, means for limiting the extent of movement of said racks, means for adjusting said last means to vary the extent of movement of the racks, means for providing a plurality of spaced electrical contacts immediately adjacent to the path of travel of the racks, electrical wiper means carried by said racks and coacting with said contacts to successively engage the same as the racks are moved, said means for operating said pawls including, sensing pins adapted to pass through perforations in a tape, and interposer means rotatable into operative position by engagement with said sensing pins, whereby said pawls are engaged by said interposers and caused to be released from engagement with said racks to permit movement of the latter.

9. In apparatus for sensing and decoding information from a record on which the characters comprising the information are represented by code designations in bit form and representing a plurality of decimal digits in which each character is represented by a sequence of perforations in the record, rack means mounted for linear movement and having decimally spaced teeth therealong, means for moving said rack means, bail means for limiting the movement of said rack means, and movable through a series of linear displacements corresponding to the decimal values of the individual perforations in said sequence, pawl means mounted on said apparatus for ratcheting engagement with said rack means, sensing means mounted for movement so as to be successively projected through each perforation of said sequence, means for moving said sensing means, interposer means mounted for movement to engage those sensing means projected through said perforations and said pawl means, and means for moving said interposer means to cause said pawl means to become disengaged from said rack means thus permitting displacement of said rack means an amount permitted by said bail means in accordance with the decimal value of each perforation sensed, the total amount of movement of said rack means being representative of the additive value of the individual perforations constituting the sequence.

10. In apparatus for sensing and decoding information from records on which the characters comprising the information are represented by code perforations, said perforations being variably positioned on the record and disposed in rows and channels thereon, a bank of sensing means oriented parallel to said channels, means for stepping said sensing means transversely to said channels and along said rows, means for moving ones of said sensing means through said perforations, pawl means in one position thereof engaging said rack means to lock said rack means against movement and movable to a second position to release said rack means for movement, interposer means, means for moving said interposer means into engagement with said ones of said sensing means passed through said perforations and said pawl means to rotate said pawl means to thereby release ones of said rack means for movement, and means for moving said rack means.

11. In apparatus for sensing and decoding information from records on which the characters comprising the information are represented by code perforations in bit form and representing a plurality of decimal digits, said perforations being variably positioned on the record and disposed in rows and channels thereon, a sensing pin mounted for movement along a row to pass through perforations in the row, an interposer, means for moving said interposer into engagement with the end of said sensing pin when the latter is passed through a perforation so as to move said interposer from an inoperative to an operative position, a rack mounted for movement from an initial position to a position corresponding to the decimal value of the perforation sensed, pawl means in one position engaging said rack to lock said rack against movement and movable to a second position by said interposer upon movement of the latter to its operative position to release said rack for movement, and means for moving said rack.

References Cited in the file of this patent

UNITED STATES PATENTS

| | | |
|---|---|---|
| 2,072,447 | Gray | Mar. 2, 1937 |
| 2,290,827 | Thomas | July 21, 1942 |
| 2,673,034 | Smith | Mar. 23, 1954 |